May 5, 1931.                L. M. BLYTH                1,803,422
                        VARIABLE TRANSMISSION GEAR
                    Filed Jan. 31, 1930    2 Sheets-Sheet 1

INVENTOR
LENNOX MILLAR BLYTH
PER
John J. Thompson
ATTORNEY

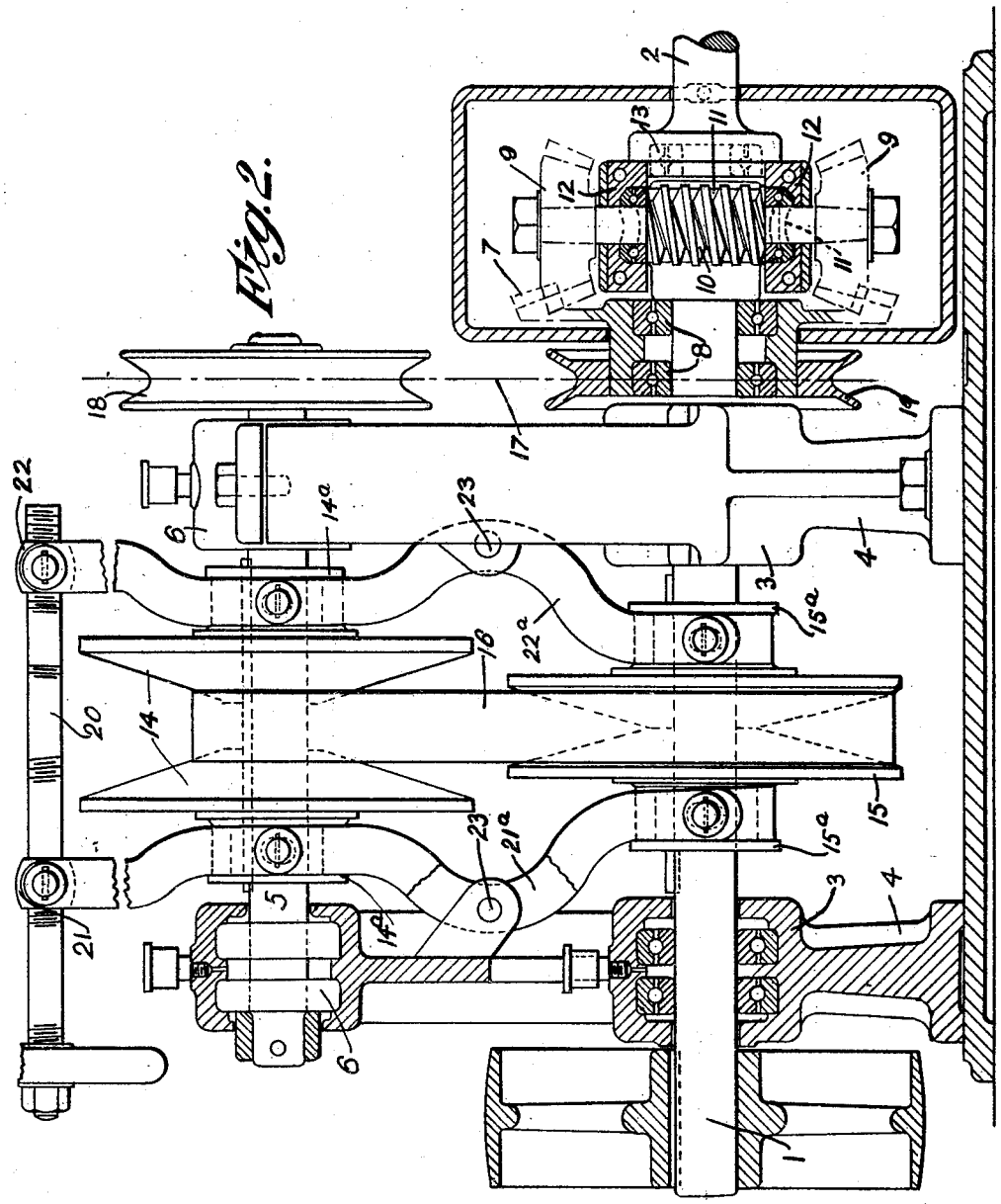

Patented May 5, 1931

1,803,422

UNITED STATES PATENT OFFICE

LENNOX MILLAR BLYTH, OF CHIRNSIDE, SCOTLAND

VARIABLE TRANSMISSION GEAR

Application filed January 31, 1930, Serial No. 424,837, and in Great Britain April 20, 1929.

The present invention relates to an improved system of gearing for transmitting rotation from one unit to another. The invention is applicable to a number of purposes, but is particularly useful in connection with heavy power drives, for instance large oil engines and steam engines, where a change in speed of the driven unit relative to the prime mover is required. The object of the present invention is to provide a construction of variable gear which will transmit a large amount of power with very little wear of the meshing gear wheels and also which will run quietly and be capable of transmitting heavy loads. Another object of this invention is to obtain an improved infinitely variable gearing.

Broadly the present invention is characterized by a driving and a driven rotary member mechanically connected by a gear train adapted to have a drive imparted to it at a speed selectively variable relative to the driving and driven members, the arrangement being that as the speed applied to said train varies so will the relative speeds of the driving and driven members vary.

According to the preferred form of invention power is transmitted through a gear train from a driving rotary member to a driven rotary member an element of said train being free to rotate relative to the driving and driven members and being constantly in mesh with the remainder of the train which is carried by one of the said rotary members and can be selectively connected at variable speeds to the other of the said rotary members by means for selectively driving the said element of the gear train at varying speeds, the arrangement being that the said train establishes a mechanical driving connection between the said two rotary members which varies their speed ratio according to the rate at which the said element of the gear train is driven relative to the driving rotary member.

Two shafts are preferably employed adapted to be connected to each other by the gearing and axially aligned, and one of the shafts is provided at a free end with an annular toothed wheel, the other shaft carrying a worm wheel meshing with one or more worm threaded shafts which are rotatable in a cross head carrying a system of gear wheels connecting each worm shaft to a gear wheel meshing with the said annular gear wheel and having driving connection therewith.

In carrying the preferred form of the present invention into practice, the said worm wheel is keyed on one end of a shaft of the driving unit and meshes with a pair of symmetrically arranged worm shafts disposed upon diametrically opposite sides of the worm wheel, the said shafts being journalled in a cross head member fixed to the driven shaft, this cross head member conveniently being a pair of parallel transverse bars integral with a plate keyed to the driven shaft.

One of the worm shafts projects through one of the cross bar members, the other shaft projecting through the other cross bar member, each worm shaft carrying at its projecting end a gear wheel meshing with a larger diameter gear wheel threaded on a stub shaft carried by each cross bar member, the pair of stub shafts also carrying bevel gear wheels meshing with the bevel teeth of an annular gear wheel mounted on the driven shaft.

The rotation of the meshing gear wheels will provide slip between the worm wheel and worm shafts thereby obtaining variations of speed, and changes in the variation of speed can be controlled by suitable arrangements of friction discs co-operating with the annular gear wheel. Alternatively any well known form of expanding pulley, governor or cones can be provided for obtaining this difference of variation of speed.

In order that my invention may be clearly understood and readily carried into effect I have appended hereto two sheets of drawings illustrating an embodiment thereof, and wherein:—

Fig. 2 is a part sectional side elevation view showing a suitable mechanical arrangement of the invention, and Fig. 3 is a sectional end elevation view showing the construction and arrangement of the cross head carrying the worm shafts hereinbefore referred to.

Figure 3:
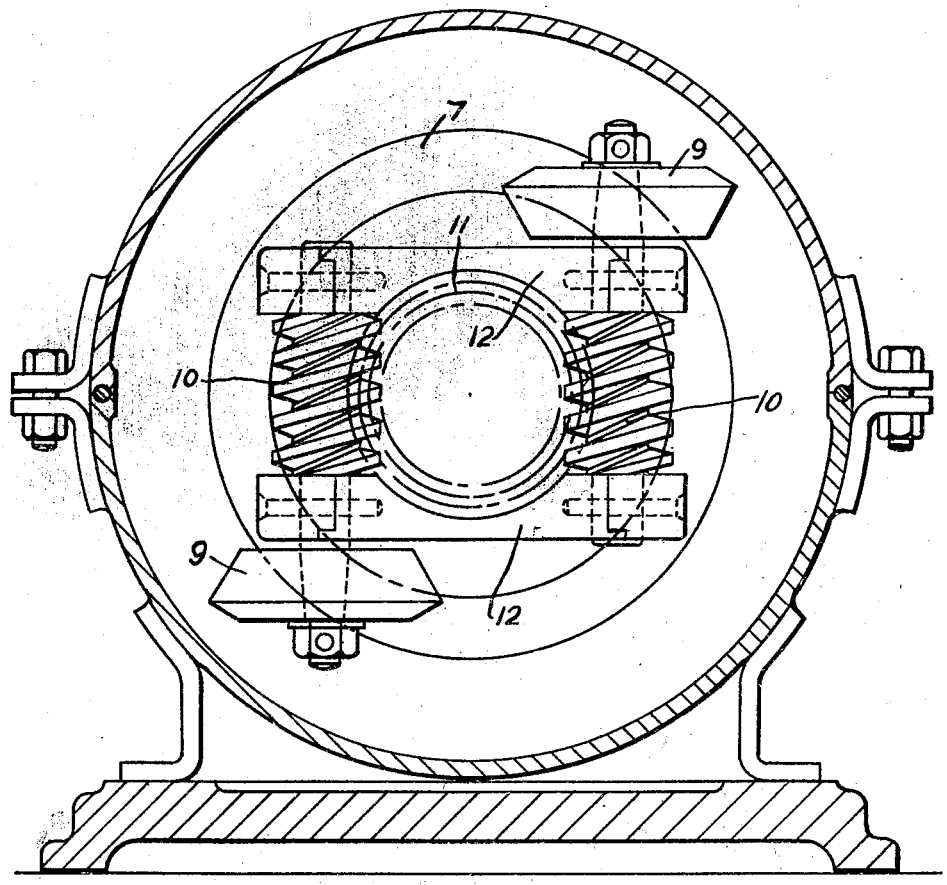
Figure 1:
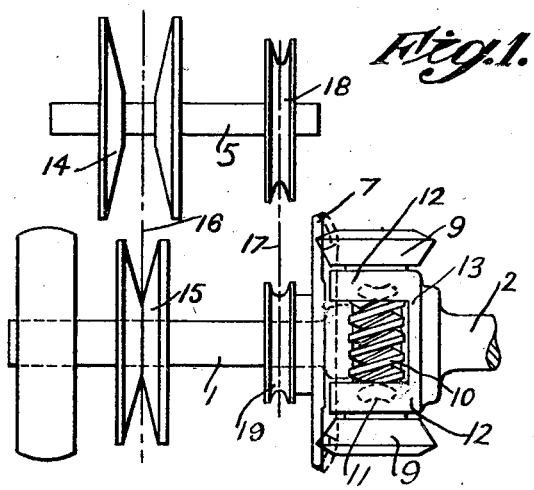
Fig. 1 is a diagrammatic side elevation view showing the relevant parts.

Referring to the drawings I have shown a driving shaft 1 arranged to impart rotation to a driven shaft 2, these shafts being shown for convenience in coaxial alignment. However it will be apparent that the shaft 1 may be the lay shaft of another shaft. The shaft 1 is mounted in suitable bearings 3 in any suitable form of bearers or frames 4 which can also carry an intermediate shaft 5 in suitable bearings 6.

The intermediate shaft 5 carries means for infinitely varying the load applied to a form of epicyclic train forming part of the mechanical connection between the driving and driven shafts 1 and 2 respectively. This gear train is not truly epicyclic in the construction shown as will be seen from Fig. 3, and it consists of a bevel gear wheel 7 mounted by means of bearings 8 idly on the shaft 1 and a pair of staggered bevel gear wheels 9 fixed to worm shafts 10 meshing with diametrically opposite points of a worm wheel 11 fixed to the end of the driving shaft 1. The worm shafts 10 are journalled in the parallel limbs 12 of a V-shaped cross head 13 fixed to the end of the shaft 2 and they are arranged to rotate axially in the same direction simultaneously and provided there is no driving connection between the bevel wheel 7 and the wheels 9 the shafts 1 and 2 are connected solidly as for a direct common speed, thereby obtaining the top speed transmission, but as soon as a drive is applied to the bevel wheel 7 causing it to rotate with the shaft 1 the worm shafts 10 will be driven in a direction which will cause the shaft 2 to drag behind the shaft 1 at a lesser speed this diminution of the speed of the driven shaft for a given speed of the driving shaft increasing with the driving speed applied to the gear wheel 7 until ultimately this driving speed could reach such a stage that the relative speeds of the gear wheel 7 and the shaft 1 would be such as to drive the shaft 2 in a reverse direction to that of the shaft 1.

Any suitable means may be employed for selectively applying a variable load and speed ratio to the gear wheel 7, and a suitable example is shown as consisting of a pair of expanding pulleys 14 and 15 connected by an endless member 16, one pulley being on the intermediate shaft 5 and the other on the driving shaft 1, the intermediate shaft 5 driving the gear wheel 7 when selected to do so, by an endless member 17 passed over two pulleys 18 and 19 fixed on the shaft 5 and on the hub of the gear wheel 7 respectively.

It will be seen that by adjusting the relative effective radii of the pulleys 14 and 15 the speed and sometimes the load applied to the gear wheel 7 will vary. For instance in Fig. 2 the gear wheel 7 is being driven at its highest speed but if the cones of the pulley 14 are separated still further practically no drive or load will be applied to the gear wheel 7 and a direct drive between the shafts 1 and 2 will be obtained, whereas if the conditions of the pulleys 14 and 15 as shown in Fig. 2 are reversed a minimum driving speed and probably a maximum load will be applied to the gear wheel 7.

Any suitable means may be provided for adjusting the pulleys 14 and 15, a suitable device consisting of a left and right handed threaded shaft 20 acting as a feed screw for a pair of nuts 21 and 22 carried by a pair of levers 21a and 22a respectively which are fulcrumed at the points 23 between the shafts 1 and 5, these levers 21a and 22a being forked at their lower ends to engage channelled bosses 15a of the two members of the pulley 15, and shaped above their fulcrum points for connection in a like manner to channelled or flanged bosses 14a of the expanding pulley 14.

Although for the purpose of simplifying the description I have referred to the meshing gear wheels 7 and 9 as bevel gearing it will be appreciated that actually in the form shown they constitute skew gearing, but it will be readily appreciated that by separating the gear wheels 9 from the worm shafts 10 and connecting them by gear wheels the gear wheels 9 can be diametrically opposed on the same axis and the teeth thereon and on the gear wheel 7 can be ordinary bevel gearing.

In describing the shafts 1 and 2 as the driving and driven shafts respectively I do not wish to limit my invention to such an arrangement as it will be apparent that the shaft 2 can be the driving shaft and the shaft 1 the driven shaft.

In describing and claiming the gear wheel 7 as carried by the shaft 1, I wish it to be understood that this contemplates any mechanical equivalent mounting of the gear wheel 7 and shaft 1.

When the invention is to be applied to heavy drives such as large oil engines or steam engines, a small pilot engine can be employed to rotate the gear wheel 7 so as to give a variation of speed when lifting away the head load. If desired, two engines may be employed dividing the load between them or transferring the load from one to the other as desired.

By means of the present invention a novel method of obtaining variable gearing is obtained in which by fine adjustments of the said expanding pulleys 14 and 15 or their equivalent a large range of changes in speed is obtained.

I claim:—

A variable speed transmission gear, comprising in combination with a drive shaft and a driven shaft rotatably mounted in coaxial relation a lay shaft in parallel relation thereto and means for rotating the lay shaft from the drive shaft at variable speeds, of a compensating variable speed drive mounted between said main drive shaft and said driven shaft and comprising a bevel gear rotatably mounted on the end of said drive shaft and adapted to be rotated by the lay shaft, a worm wheel secured on the end of said drive shaft adjacent said bevel gear, a cross head secured on the abutting end of the driven shaft, a pair of shafts rotatably mounted in said cross head at right angles to said drive shaft, worms carried thereby and in mesh with said worm gear, and bevel pinions mounted on the ends of said shafts and in mesh with said bevel gear.

LENNOX MILLAR BLYTH.